(12) United States Patent
Abe (10) Patent No.: US 8,077,203 B2
(45) Date of Patent: Dec. 13, 2011

(54) VEHICLE-PERIPHERY IMAGE GENERATING APPARATUS AND METHOD OF CORRECTING DISTORTION OF A VEHICLE-PERIPHERY IMAGE

(75) Inventor: Koichi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 561 days.

(21) Appl. No.: 12/255,005

(22) Filed: Oct. 21, 2008

(65) Prior Publication Data

US 2009/0121851 A1    May 14, 2009

(30) Foreign Application Priority Data

Nov. 9, 2007   (JP) ................................. 2007-292224

(51) Int. Cl.
  *H04N 7/18* (2006.01)
(52) U.S. Cl. ...................................................... 348/148
(58) Field of Classification Search .................. 348/148, 348/149, 36, 38
  See application file for complete search history.

(56) References Cited

U.S. PATENT DOCUMENTS

| | | | |
|---|---|---|---|
| 7,161,616 B1 | 1/2007 | Okamoto et al. | |
| 2006/0274147 A1* | 12/2006 | Chinomi et al. | 348/118 |
| 2007/0206835 A1* | 9/2007 | Abe | 382/104 |
| 2008/0231702 A1* | 9/2008 | Matsumoto et al. | 348/148 |
| 2009/0073263 A1* | 3/2009 | Harada et al. | 348/148 |
| 2010/0079267 A1* | 4/2010 | Lin | 340/435 |

FOREIGN PATENT DOCUMENTS

JP     2004-213489    7/2004

* cited by examiner

*Primary Examiner* — Jason Whipkey
(74) *Attorney, Agent, or Firm* — Brinks Hofer Gilson & Lione (57) ABSTRACT

A vehicle-periphery image generating apparatus and a method of correcting distortion of vehicle-periphery image corrects distortion of the obstacle image appearing in the vehicle-periphery image after viewpoint conversion, so that visual discomfort experienced by the driver is reduced. Images around the vehicle are captured by a plurality of cameras, and an obstacle around the vehicle is detected by an ultrasonic sensor. When the obstacle is detected, a width of an image in the region positioned on the far side of the obstacle is compressed in the center direction of the images to generate the vehicle-periphery image. As a result, when a three-dimensional obstacle around the vehicle appears in an camera image, the camera image is viewpoint-converted so that enlargement or stretching of the obstacle image can be prevented.

12 Claims, 7 Drawing Sheets

DRAWING FOR EXPLAINING OUTLINE OF IMAGE COMPRESSION OPERATION
(DISTORTION CORRECTION OPERATION OF OBSTACLE IMAGES)

FIG. 1

CONFIGURATION EXAMPLE OF VEHICLE-PERIPHERY IMAGE GENERATING APPARATUS ACCORDING TO THE PRESENT EMBODIMENT

FIG. 2

ARRANGEMENT EXAMPLE OF CAMERAS AND ULTRASONIC SENSORS

FIG.3

ONE EXAMPLE OF OBSTACLE DETECTION OPERATIONS ACCORDING TO THE PRESENT EMBODIMENT

DRAWING FOR EXPLAINING CONCEPT OF MAPPING TABLE INFORMATION

DRAWING FOR EXPLAINING OUTLINE OF IMAGE COMPRESSION OPERATION
(DISTORTION CORRECTION OPERATION OF OBSTACLE IMAGES)

OPERATION EXAMPLE OF VEHICLE-PERIPHERY IMAGE GENERATING APPARATUS ACCORDING TO THE PRESENT EMBODIMENT

FIG.7

DRAWING FOR EXPLAINING OUTLINE OF IMAGE COMPRESSION OPERATION
(DISTORTION CORRECTION OPERATION OF OBATACLE IMAGES)

VEHICLE-PERIPHERY IMAGE GENERATING APPARATUS AND METHOD OF CORRECTING DISTORTION OF A VEHICLE-PERIPHERY IMAGE

PRIORITY CLAIM

This application claims the benefit of Japanese Patent Application No. 2007-292224, filed on Nov. 9, 2007, and which is incorporated by reference herein in its entirety.

BACKGROUND OF THE INVENTION

1. Field of the Invention

The present invention relates to a vehicle-periphery image generating apparatus and a method of correcting distortion of a vehicle-periphery image. In particular, the present invention relates to a vehicle-periphery image generating apparatus for generating a vehicle-periphery image for supporting operation and a method of correcting distortion of an obstacle image appearing in the vehicle-periphery image.

2. Description of the Related Art

Conventionally, there has been proposed a system of generating and displaying a vehicle-periphery image viewed from a virtual point of view above a vehicle by installing a plurality of cameras on the front, rear, left and right sides of the vehicle, and converting images around the vehicle captured by the plurality of cameras, and combining the respective viewpoint-converted images. According to this system, a driver can understand a positional relation between the vehicle and an obstacle near the vehicle by viewing the vehicle-periphery image displayed on a display device, and driving the vehicle so as to prevent collisions.

In such systems, the viewpoint conversion is performed such that the entire object captured by a camera is projected to a height equal to a height of a road surface. Therefore, an image of a three-dimensional obstacle around the vehicle is distorted, particularly toward the far side as viewed from the camera (vehicle), which causes driver visual discomfort. To address the distortion problem, a technique capable of relieving the driver discomfort caused by the distortion is proposed in Japanese Patent Laid-Open Publication No. 2004-213489 ("the JP '489 publication").

In the technique disclosed in the JP '489 publication, an image of the obstacle shown in the viewpoint-converted image is masked so that only the obstacle's circumferential profile position can be recognized. By using this process, even if a pattern exists in the obstacle, the obstacle is displayed without distortion, and therefore, the uncomfortable sensation due to the distortion can be relieved.

However, in the technique disclosed in the JP '489 publication, the obstacle (e.g., its circumferential profile) in the viewpoint-converted image is shown in a distorted manner. Moreover, only the circumferential profile of the distorted obstacle is displayed. Therefore, it is difficult for a driver to determine what kind of obstacles the displayed profile indicates, which may make a driver uneasy or cause driver discomfort. Further, because the obstacle image around the vehicle is still distorted, it is difficult for a driver to sense the distance between the vehicle and the obstacle.

SUMMARY OF THE INVENTION

The present invention solves the above-described problems. An object of the present invention is to suppress distortion of an obstacle image appearing in the vehicle-periphery image after viewpoint conversion to relieve driver discomfort.

To solve the above-described problem, in the present invention, images around the vehicle, as well as the obstacle, are captured by a plurality of cameras disposed around the vehicle. When the obstacle is detected, a width of an image in the region positioned on the far side of the obstacle, as viewed from the vehicle among the images around the vehicle captured by the camera in the direction in which the obstacle is detected, is compressed in the center direction of the images around the vehicle. Thus, the vehicle-periphery image is generated.

When a three-dimensional obstacle around the vehicle is captured by a camera and the captured image is viewpoint-converted, the obstacle image is distorted and appears to be enlarged toward the far side as viewed from the vehicle. However, according to the present invention, the obstacle image is compressed in the direction opposite to the direction in which the obstacle image is enlarged. Therefore, distortion of the obstacle image appearing in the vehicle-periphery image after the viewpoint conversion, is suppressed to minimize visual discomfort experienced by the driver.

In addition, according to the present embodiment, only an image in the region positioned on the far side of the obstacle as viewed from the vehicle is compressed. Therefore, the vehicle-periphery image is generated without performing the compression on the image in the region near the vehicle where no obstacle exists.

Accordingly, an image of a road surface near the vehicle is viewpoint-converted without being compressed, and at the same time, the obstacle image is compressed so that the distortion of the image can be minimized. As a result, a more realistic vehicle-periphery image is generated where a driver can more easily sense the distance between the vehicle and the obstacle.

DETAILED DESCRIPTION OF THE PREFERRED EMBODIMENTS

Figure 1:
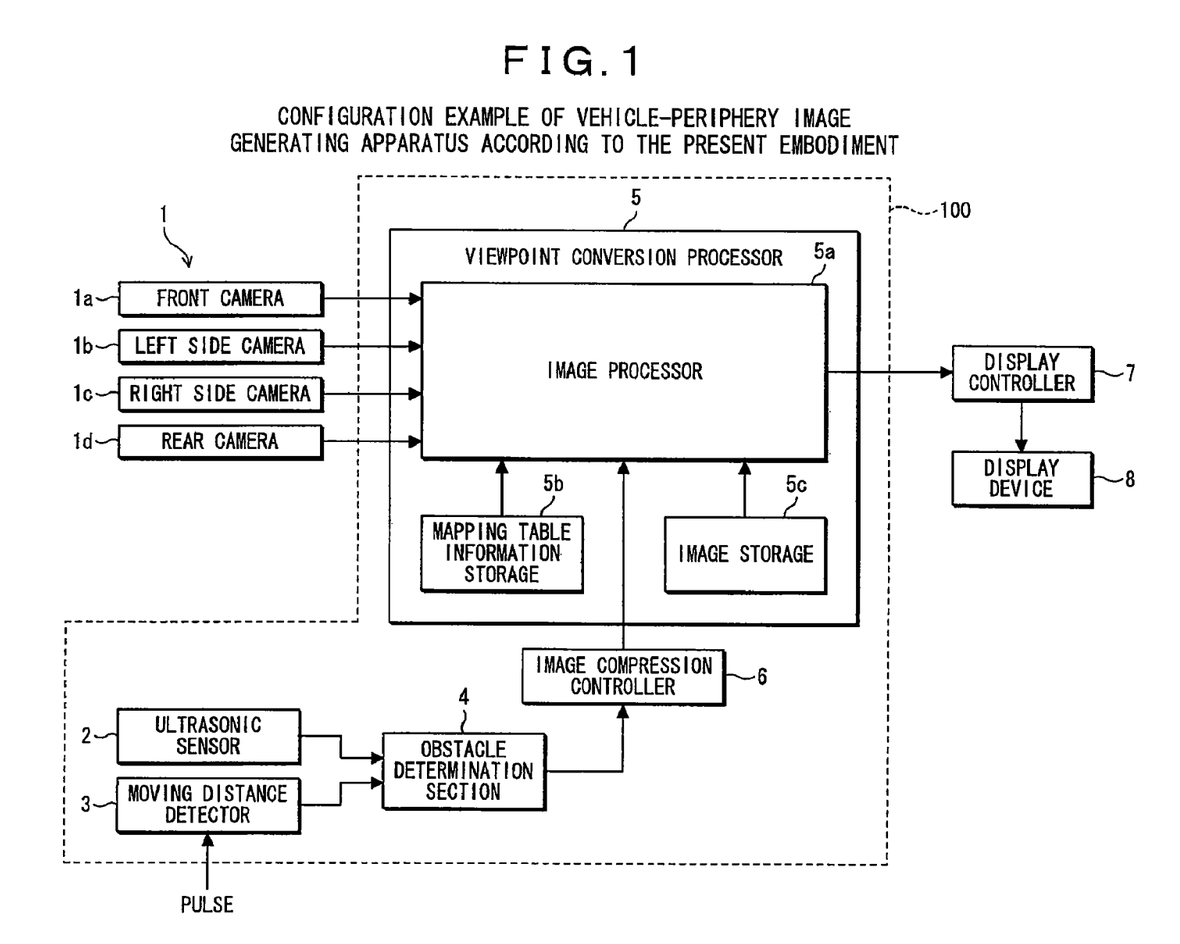
FIG. 1 is a block diagram showing a vehicle-periphery image generating apparatus according to one embodiment.

One embodiment of the present invention will be described in detail below with reference to the accompanying drawings. FIG. 1 is a block diagram showing an example of a vehicle-periphery image generating apparatus 100 according to the present embodiment. In FIG. 1, reference numeral 1 designates a plurality of cameras installed at different locations of a vehicle to capture images of peripheral areas of the vehicle. The cameras include a front camera 1a, a left side camera 1b, a right side camera 1c, and a rear camera 1d.

Reference numeral 2 designates an ultrasonic sensor (corresponding to a sensor section of the present invention) which detects the presence or absence of an obstacle around the vehicle, as well as a distance from the vehicle to the obstacle based on a reflected radio wave or ultrasonic emission. The distance from the vehicle to the obstacle can be calculated as the product of the time when an ultrasonic wave radiated by the ultrasonic sensor 2 is reflected from the obstacle back to the sensor 2, and based on the known speed of the ultrasonic wave. Further, a direction from the vehicle to the obstacle can be found from the direction of the return reflected wave. A plurality of the ultrasonic sensors 2 are also installed at different locations of the vehicle.

Figure 2:
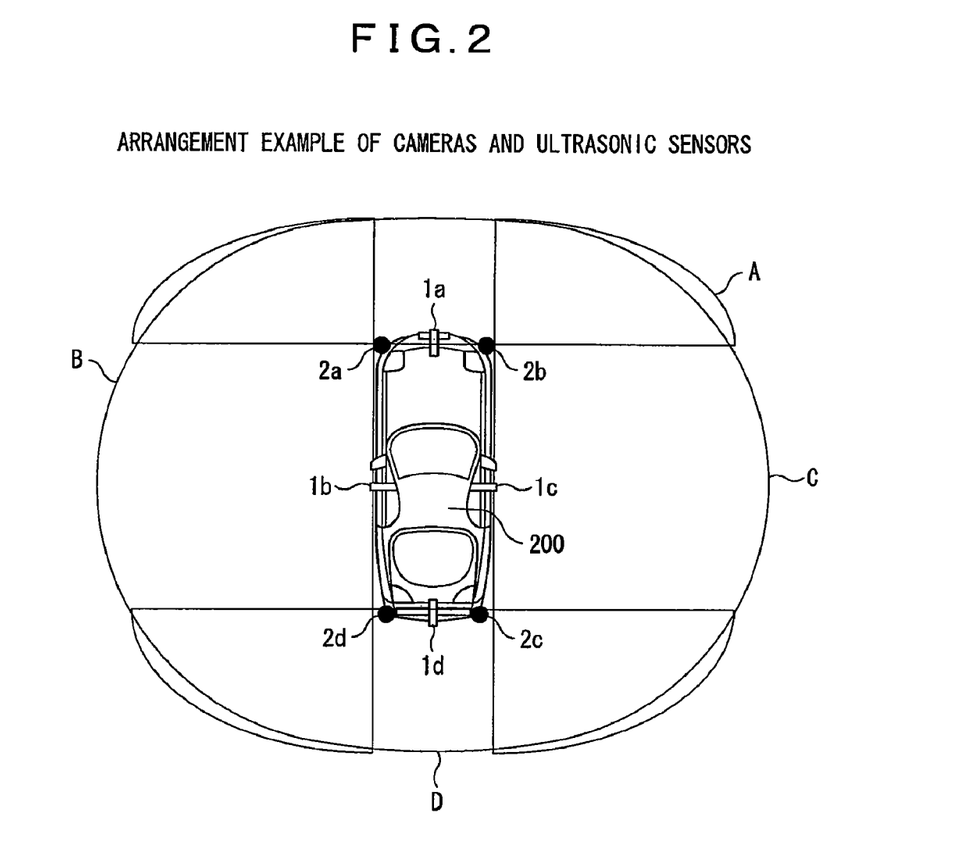
FIG. 2 is a drawing showing an arrangement of cameras and ultrasonic sensors.

FIG. 2 is a diagram showing an arrangement of the cameras 1 and the ultrasonic sensors 2. In FIG. 2, the front camera 1a is arranged on the front of a vehicle 200 and shoots an image in the range of the front A. The left side camera 1b is arranged on the left side of the vehicle 200 and shoots an image in the range of the left side B. The right side camera 1c is arranged on the right side of the vehicle 200 and shoots an image in the range of the right side C. The rear camera 1d is arranged on the rear of the vehicle 200 and shoots an image in the range of the rear D. The respective cameras 1a to 1d may have an ultra-wide-angle lens, such as a fish-eye lens, so as to capture images in the wide range.

The ultrasonic sensor 2 includes, for example, four ultrasonic sensors 2a to 2d installed at four corners of the vehicle 200, each of which has directivity in a predetermined range. Although the ultrasonic sensor 2 is used in this embodiment, another sensor technology, such as millimeter-wave radar, may be used. The millimeter-wave radar radiates microwave energy around the vehicle 200 and detects the presence or absence of obstacles, as well as a distance from the vehicle to the obstacle based on a reflected wave.

Reference numeral 3 designates a moving distance detector, which detects a moving distance of the vehicle. For example, a dead reckoning sensor (not shown) is provided on the vehicle mounted with the vehicle-periphery image generating apparatus 100. The dead reckoning sensor includes a distance sensor for outputting one pulse for each predetermined travel distance of the vehicle. The moving distance detection section 3 sequentially inputs a pulse outputted from the distance sensor and detects a moving distance of the vehicle based on the number of inputted pulses.

Reference numeral 4 designates an obstacle determination section. When the moving distance detector 3 detects that the vehicle moves for a predetermined distance while the ultrasonic sensor 2 outputs a response indicating that the obstacle exists, the obstacle determination section 4 determines that the obstacle exists around the vehicle. For example, when the moving distance detector 3 detects that the vehicle moves for a predetermined distance (e.g., one meter) while the ultrasonic sensor 2d on the rear-left side detects an obstacle, the obstacle determination section 4 determines that the obstacle exists on the rear-left side of the vehicle. An obstacle detector of the present invention includes the above-described ultrasonic sensor 2, moving distance detector 3 and obstacle determination section 4.

Figure 3:
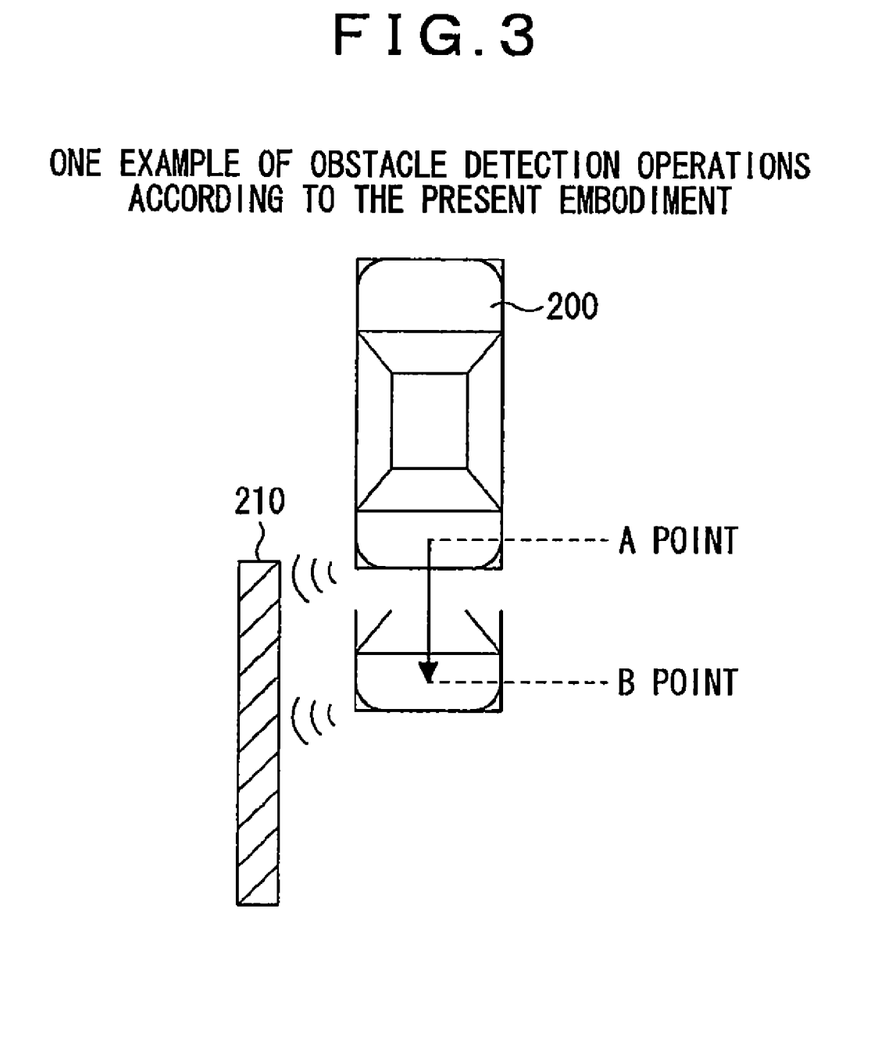
FIG. 3 is a drawing showing an obstacle detection operation according to the present invention.

FIG. 3 is a drawing showing one example of an obstacle detection operation by the obstacle detector. Assume, for example, that when the vehicle 200 moves backward in a parking space, a three-dimensional obstacle 210 exists on the left side of the vehicle 200. In this case, when the vehicle 200 moves back toward point A, (a point where a rear of the vehicle 200 faces an edge of the obstacle 210), the obstacle 210 is detected by the ultrasonic sensor 2d on the rear-left side. At this time, however, the obstacle determination section 4 has not yet determined that the obstacle exists.

Thereafter, when the vehicle 200 continues to move back to a point B (a point to which the vehicle 200 moves for a predetermined distance (one meter) while the ultrasonic sensor 2d first detects an obstacle and then outputs a response that the obstacle exists), the obstacle determination section 4 determines that the obstacle exists on the left side of the vehicle 200.

When the obstacle detector is constructed as described above, a three-dimensional object having a width of less than 1 meter, such as a columnar pole, is not detected as an obstacle and only a three-dimensional object having a width of more than 1 meter, such as another vehicle or a wall, is detected as an obstacle. As described below, in the present embodiment, when an obstacle is detected by the obstacle determination section 4, distortion correction of a three-dimensional object image is performed using image compression. That is, the three-dimensional object having a width of less than 1 meter is excluded from the object to be detected as an obstacle to reduce a processing load, since, even if its image is distorted as if compressed the far side as viewed from the vehicle 200, the distorted image does not cause significant driver discomfort.

However, if priority is given to suppression or reduction of distortion in the three-dimensional object image even if the processing load is increased, the object having a width of less than 1 meter may also be detected as an object of the distortion correction. In this case, the moving distance detector 3 is not required, and an obstacle is detected based on only the output of the ultrasonic sensor 2.

Reference numeral 5 designates a viewpoint conversion processor. The viewpoint conversion processor 5 inputs a plurality of images around the vehicle captured by a plurality of the cameras 1a to 1d, and viewpoint-converts each of the plurality of inputted images around the vehicle. The viewpoint conversion processor 5 then combines the respective images after the viewpoint conversion. Thus, the viewpoint conversion processor 5 generates the vehicle-periphery image viewed from the virtual point of view above the vehicle. Because the images around the vehicle are captured through a fish-eye lens, distortion due to lens characteristics exists. The viewpoint conversion processor 5 first corrects the distortion of the images caused by the cameras 1a to 1d, and then performs viewpoint conversion processing on the distortion-corrected images. Hereinafter, the distortion corrected vehicle-periphery images captured by the cameras 1a to 1d are referred to as "camera images".

As shown in FIG. 1, the viewpoint conversion processor 5 includes an image processor 5a, a mapping table information storage 5b and an image storage 5c. The image processor 5a inputs the front, left side, right side, and rear captured images from the plurality of cameras 1a to 1d. Then, according to mapping table information (coordinate transformation information) stored in the mapping table information storage 5b, the image processor 5a generates a background image of the periphery of the vehicle, as viewed from above the vehicle. This background image is generated based on the images around the vehicle captured by the plurality of cameras 1a to 1d. Accordingly, the background image includes only an actual background and an obstacle included in the background, and does not include an image of the vehicle.

Further, the image processor 5a reads out, from the image storage 5c, vehicle image data indicating an image of the vehicle viewed from above the vehicle, and combines the vehicle image at a predetermined position of the background image (e.g., a center of the background image where the vehicle exists). Thus, a vehicle-periphery image is generated, where the background image and the vehicle image are combined.

The mapping table information storage 5b stores information describing the corresponding relation between pixel data of camera images captured by the plurality of cameras 1a to 1d and pixel data of the background image of the periphery of the vehicle viewed from a virtual point of view above the vehicle, namely, the mapping table information including the coordinate transformation information indicating to which pixel of the background image each pixel of the camera images corresponds. The image storage 5c stores the vehicle image data indicating an image of the vehicle viewed from above the vehicle and the data is read out by the image processor 5a, if necessary.

Reference numeral 6 designates an image compression controller. When an obstacle is detected by the obstacle determination section 4, the image compression controller performs a compression process. Next, in the center direction of the images around the vehicle, a width of an image in the direction in which the obstacle is detected in the region positioned on the far side of the obstacle, as viewed from the vehicle among the images around the vehicle (a background image to be precise).

Reference numeral 7 designates a display controller. The display controller 7 controls display device 8 so as to display the vehicle-periphery image generated by the viewpoint conversion processor 5, which is based on the control of the image compression controller 6.

The image compression controller 6 controls image compression by switching the mapping table information used in the viewpoint conversion processing by the image processor 5a. That is, in the present embodiment, the mapping table information storage 5b stores normal mapping table information used when the obstacle is not detected by the obstacle determination section 4, and compression mapping table information used when the obstacle is detected by the obstacle determination section 4. Further, when the obstacle is detected by the obstacle determination section 4, the image compression controller 6 controls the image processor 5a to perform viewpoint conversion processing using the compression mapping table information for the camera image around the vehicle captured by the camera in the direction in which the obstacle is detected.

Specifically, when the obstacle is detected by the obstacle determination section 4, the image compression controller 6 controls the image processor 5a to perform viewpoint conversion processing using the normal mapping table information for an image in the region positioned on the near side of the obstacle, as viewed from the vehicle. The image compression controller 6 also controls the image processor 5a to perform viewpoint conversion processing using the compression mapping table information for an image in the region positioned on the far side of the obstacle as viewed from the vehicle among the camera images around the vehicle captured by a camera in the direction in which the obstacle is detected.

Here, one example of the normal mapping table information and compression mapping table information stored in the mapping table information storage 5b will be described with reference to FIGS. 4(a) and 4(b). Further, one example of the image compression operation (a distortion correction operation for an obstacle image) by the image compression controller 6 will be described with reference to FIGS. 5(a) and 5(b).

Figure 4A:
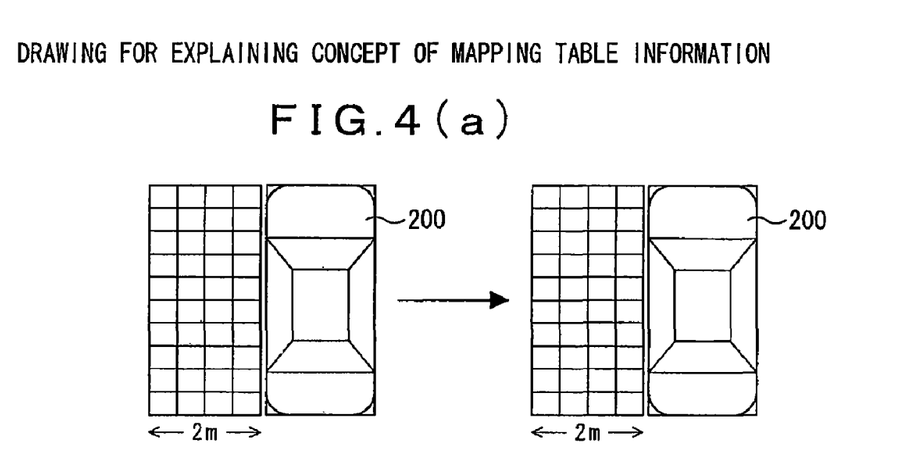
FIGS. 4(a) and 4(b) are drawings explaining mapping table information.
Figure 4B:
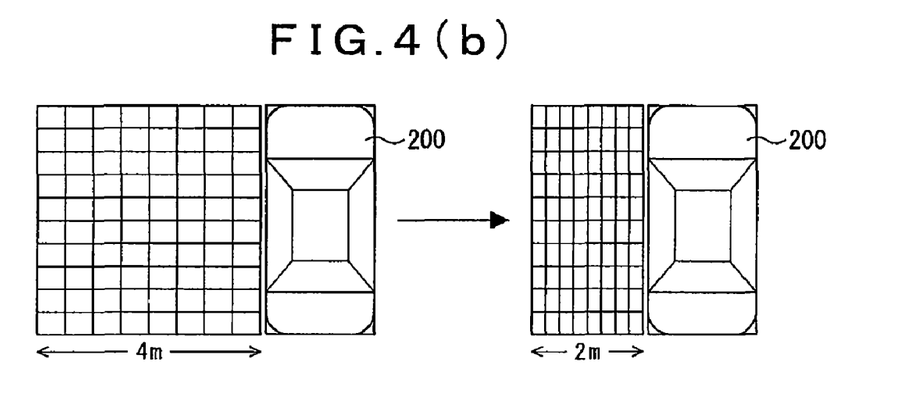

FIGS. 4(a) and 4(b) are drawings explaining the mapping table information, where FIG. 4(a) shows normal mapping table information, and FIG. 4(b) shows compression mapping table information. Here, FIGS. 4(a) and 4(b) show, as one example, a concept of the mapping table information, which indicates the corresponding relationship between pixel data of a left side camera image captured by the left side camera 1b, and pixel data of a left side background image. In FIGS. 4(a) and 4(b), grids shown on the left side of the vehicle 200 visually illustrate the presence or absence of image compression and the direction of compression. Note that the grid itself has no specific meaning.

As shown in FIG. 4(a), the normal mapping table information is, for example, information for coordinate-transforming of the camera image in the range up to about two meters left from the vehicle 200 into the background image in the range up to two meters left from the vehicle 200. As described above, since the respective cameras 1a to 1d capture images around the vehicle in a wide range through the fish-eye lens, an object in the range exceeding 2 meters from the vehicle 200 is also included in the captured image. However, as the object becomes further away from the vehicle 200, distortion of the image increases. For example, the image of the object in the range exceeding 2 meters has excessively large distortion, and therefore, the image is excluded from the display object range of the vehicle-periphery image. That is, a small distorted image in the range within 2 meters around the vehicle 200 is normally displayed as the vehicle-periphery image, whereas an image in the range exceeding 2 meters is excluded from the object of the viewpoint conversion processing.

In contrast, as shown in FIG. 4(b), the compression mapping table information is information for coordinate-transforming the camera image in the range equal to about twice the display object range of the vehicle-periphery image, for example, a camera image in the range up to 4 meters left from the vehicle 200 into the background image in the range up to 2 meters left from the vehicle 200. That is, the compression mapping table information represents information for coordinate-transforming the camera image into the background image, while compressing the camera image to about one-half in the center direction of the images around the vehicle. The image compression can be performed, for example, by a thinning processing for thinning the pixel data of the camera image for every other pixel in the horizontal direction, which replaces the camera image by the background image.

Figure 5A:
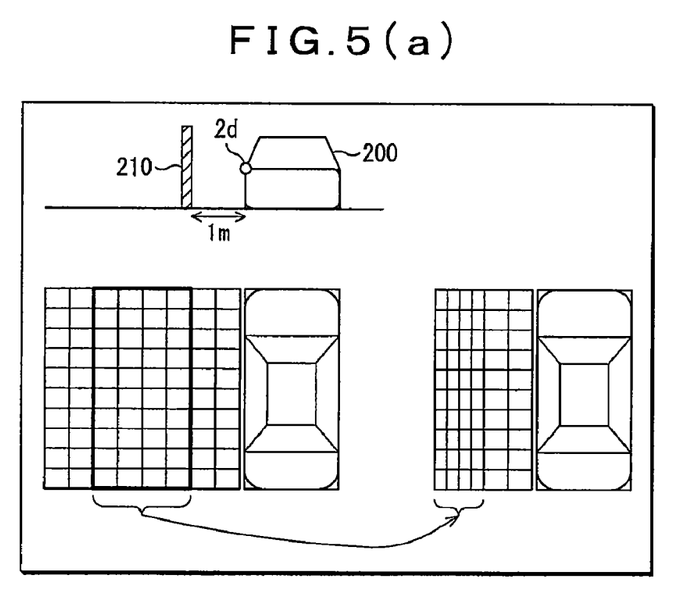
FIGS. 5(a) and 5(b) are drawings explaining an image compression operation (distortion correction operation for obstacle images) by an image compression controller according to the present embodiment.
Figure 5B:
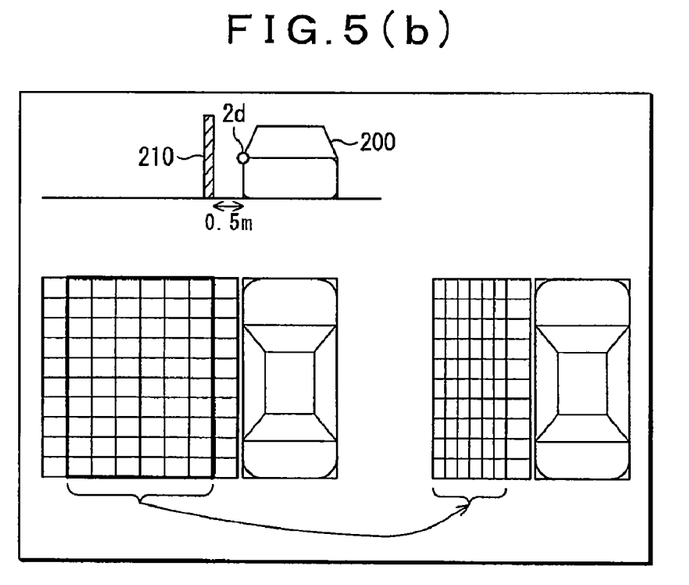

FIGS. 5(a) and 5(b) are drawings illustrating an image compression operation (distortion correction operation for an obstacle image) by the image compression controller 6. FIG. 5(a) shows an operation example where the obstacle determination section 4 detects that the obstacle exists at a distance of 1 meter from the vehicle 200. FIG. 5(b) shows an operation where the obstacle determination section 4 detects that the obstacle exists at a distance of 0.5 meter from the vehicle 200.

As shown in FIG. 5(a), when the obstacle is detected at a distance of 1 meter from the vehicle 200, the image processor 5a viewpoint-converts the camera image in the range up to 1 meter from the vehicle 200 into the background image in the range up to 1 meter from the vehicle 200, using the normal mapping table information shown in FIG. 4(a) for the image in the internal region up to 1 meter from the vehicle 200 among the left side camera images where the obstacle is detected.

Further, the image processor 5a viewpoint-converts the camera image in the range of 1 to 3 meters from the vehicle 200 into the background image in the range of 1 to 2 meters from the vehicle 200, while compressing the camera image using the compression mapping table information shown in FIG. 4(b) for the image in the external region exceeding 1 meter from the vehicle 200 among the left side camera images where the obstacle is detected.

At this time, the image processor 5a compresses the entire image in the region positioned on the far side of the obstacle as viewed from the vehicle 200 and in the portion used as the display object range of the vehicle-periphery image. The term "the entire or whole image" does not mean the whole of the camera image corresponding to the image in the region (external region exceeding 1 meter) positioned on the far side of the obstacle. Rather, this term means the whole of an image in the region positioned on the far side of the obstacle and in the portion used as the display object range of the vehicle-periphery image.

For example, although the camera image captured by the left side camera 1b through the fish-eye lens also includes an object in the range exceeding 4 meters from the vehicle 200, the camera image to be processed by image compression is the whole of the camera image corresponding to the image in the range of 1 to 3 meters from the vehicle 200, while the camera image in the range exceeding 3 meters is not subjected to the image compression. However, with respect to the region of 1 to 3 meters from the vehicle 200 used as the display object range of the vehicle-periphery image, the whole of the camera image in this region is subjected to the image compression.

For example, as shown in FIG. 3, the obstacle determination section 4 determines that the obstacle exists on the left side of the vehicle 200 at a time when the vehicle 200 moves backward toward point B, and the image compression controller 6 starts the image compression processing. At this time, in the left side camera image as viewed from the vehicle 200, the obstacle 210 is shown only in a part of the region. However, with respect to the camera image in the region of 1 to 3 meters from the vehicle 200, the whole of the camera image in this region is subjected to the image compression, as shown in FIG. 5(a).

On the other hand, as shown in FIG. 5(b), if the obstacle is detected at a distance of 0.5 meter from the vehicle 200, the image processor 5a viewpoint-converts the camera image in the range up to 0.5 meter from the vehicle 200 into the background image in the range up to 0.5 meter from the vehicle 200 using the normal mapping table information shown in FIG. 4(a) for the image in the internal region up to 0.5 meter from the vehicle 200 among the left side camera images where the obstacle is detected.

Further, the image processor 5a viewpoint-converts the camera image in the range of 0.5 to 3.5 meters from the vehicle 200 into the background image in the range of 0.5 to 2 meters from the vehicle 200, while compressing the camera image using the compression mapping table information shown in FIG. 4(b) for the image in the external region exceeding 0.5 meter from the vehicle 200 among the left side camera images where the obstacle is detected.

The following describes direct viewpoint-conversion of the camera image into the background image using the normal mapping table information and compression mapping table information stored in the mapping table information storage 5b. However, the present invention is not limited to this process. For example, other methods may be used where the image compression controller 6 generates display mapping table information from the normal mapping table information and the compression mapping table information, and the image processor 5a performs the viewpoint conversion processing using the generated display mapping table information.

For example, as shown in FIG. 5(a), the image compression controller 6 generates the display mapping table information on the image in the internal region up to 1 meter from the vehicle 200 using the normal mapping table information for the image portion in the range up to 1 meter from the vehicle 200. Further, the image compression controller 6 generates the display mapping table information on the image in the external region exceeding 1 meter from the vehicle 200 using the compression mapping table information for the image portion in the range of 1 to 3 meters from the vehicle 200.

The above-described method of correcting distortion of the vehicle-periphery image according to the present embodiment can be realized by various hardware configurations, DSP (digital signal processing) devices, and software configuration and algorithms. When embodied as a software configuration, for example, since the vehicle-periphery image generating apparatus 100 according to the present embodiment includes a CPU of a computer MPU, RAM, ROM or the like, the method can be realized by an operating a program stored in the RAM and ROM.

Figure 6:
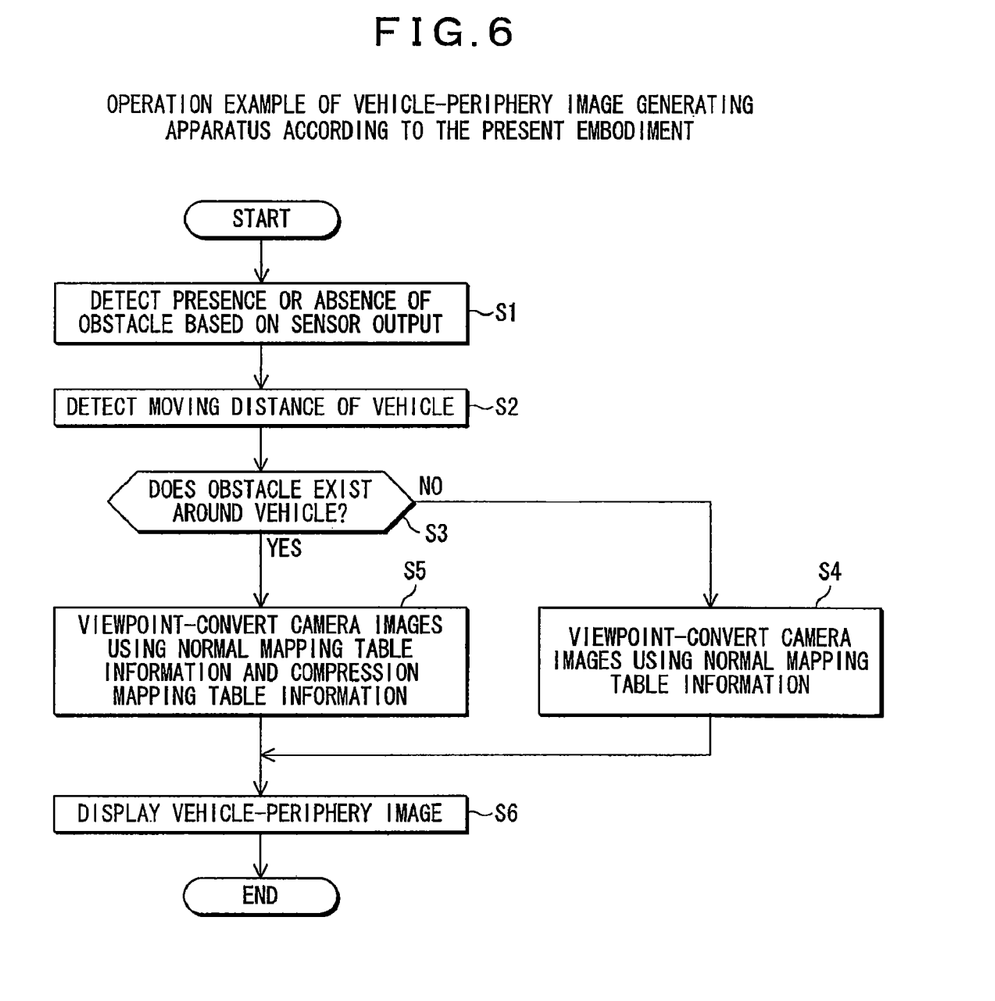
FIG. 6 is a flowchart showing operation of the vehicle-periphery image generating apparatus according to the present embodiment.

Next, operations of the above-configured vehicle-periphery image generating apparatus 100 according to the present embodiment will be described. FIG. 6 is a flowchart showing operation of the vehicle-periphery image generating apparatus 100. In FIG. 6, the ultrasonic sensor 2 detects the presence or absence of an obstacle and the distance from the vehicle to the obstacle, based on a reflected radio wave (Step S1). Further, the moving distance detector 3 detects a moving distance of the vehicle based on the number of pulses inputted externally from (distance sensor not shown) of the vehicle-periphery image generating apparatus 100 (Step S2).

The obstacle determination section 4 determines whether the vehicle has moved a predetermined distance while the ultrasonic sensor 2 detects an obstacle, and then determines whether the obstacle exists around the vehicle (Step S3). In this step, when the obstacle determination section 4 determines that no obstacle exists in any direction, the viewpoint conversion processor 5 performs the viewpoint conversion processing on the front, rear, left and right camera images using the normal mapping table information, and generates the vehicle-periphery image (Step S4).

When the obstacle determination section 4 determines that an obstacle exists in a specific direction, the viewpoint conversion processor 5 performs the viewpoint conversion processing on the camera images using the compression mapping table information in addition to the normal mapping table information, and generates the vehicle-periphery image (Step S5).

Specifically, the viewpoint conversion processor 5 performs viewpoint conversion processing using the normal mapping table information for a camera image in the direction in which no obstacle is detected. Further, the viewpoint conversion processor 5 performs viewpoint conversion processing using the normal mapping table information for an image portion in the region positioned on the near side of the obstacle, as viewed from the vehicle, as well as using the compression mapping table information for an image portion in the region positioned on the far side of the obstacle, as viewed from the vehicle among the camera images in the direction in which an obstacle is detected.

Then, the display controller 7 displays the vehicle-periphery image generated by the viewpoint conversion processor 5 in Step S4 or S5 on the display device 8 (Step S6). In addition, while the display mode for the vehicle-periphery image is set, the processes of Steps S1 to S6 are repeatedly performed.

As described in detail above, in the present embodiment, images around the vehicle are captured by the camera 1, while an obstacle around the vehicle is detected by the ultrasonic sensor 2. When the obstacle is detected, a width of an image in the region positioned on the far side of the obstacle, as viewed from the vehicle among the camera images around the vehicle, is compressed in the center direction of the images around the vehicle. Thus, the vehicle-periphery image is generated.

As a result, when a three-dimensional obstacle around the vehicle appears in a camera image, when the camera image is viewpoint-converted, the obstacle image can be prevented from being enlarged as if compressed to the far side as viewed from the vehicle. That is, according to the present embodiment, the obstacle image is compressed in the direction opposite to the direction in which the obstacle image is enlarged when the normal viewpoint conversion processing is performed. Therefore, distortion of the obstacle image appearing in the vehicle-periphery image after viewpoint conversion is suppressed, so that driver discomfort is reduced.

In addition, according to the present embodiment, only an image portion in the region on the far side of the obstacle, as viewed from the vehicle 200, is compressed. Therefore, the vehicle-periphery image is generated without performing the compression on the image portion in the region near the vehicle, in which no obstacle exists. Accordingly, an image of a road surface near the vehicle is viewpoint-converted without being compressed, and at the same time, an image of the obstacle is compressed so that the distortion of the image can be suppressed. As a result, a more realistic vehicle-periphery image is generated so that a driver can more easily sense the distance between the vehicle and the obstacle.

In the present embodiment, when the obstacle is detected by the obstacle determination section 4, a compression on the entire image in the region positioned on the far side of the obstacle, as viewed from the vehicle and in the portion used as a display object range of the vehicle-periphery image among the camera images in the direction in which the obstacle, is detected. For example, a method may be used in which, among the camera images in the direction in which the obstacle is detected, only an image in the region positioned on the far side of the obstacle, as viewed from the vehicle, is compressed.

As shown in FIG. 3, when the vehicle 200 moves back to point A, the obstacle 210 is detected by the left rear ultrasonic sensor 2d. Then, when the vehicle 200 moves back to point B while the ultrasonic sensor 2d outputs a response indicating that the obstacle exists, the obstacle determination section 4 detects the obstacle 210 in the interval (interval from the point A to point B) and outputs a response that the obstacle exists. In response to this detection result, the image compression controller 6 controls the image processor 5a to perform compression only on an image portion in the interval from point A to point B where the obstacle 210 is detected.

Figure 7:
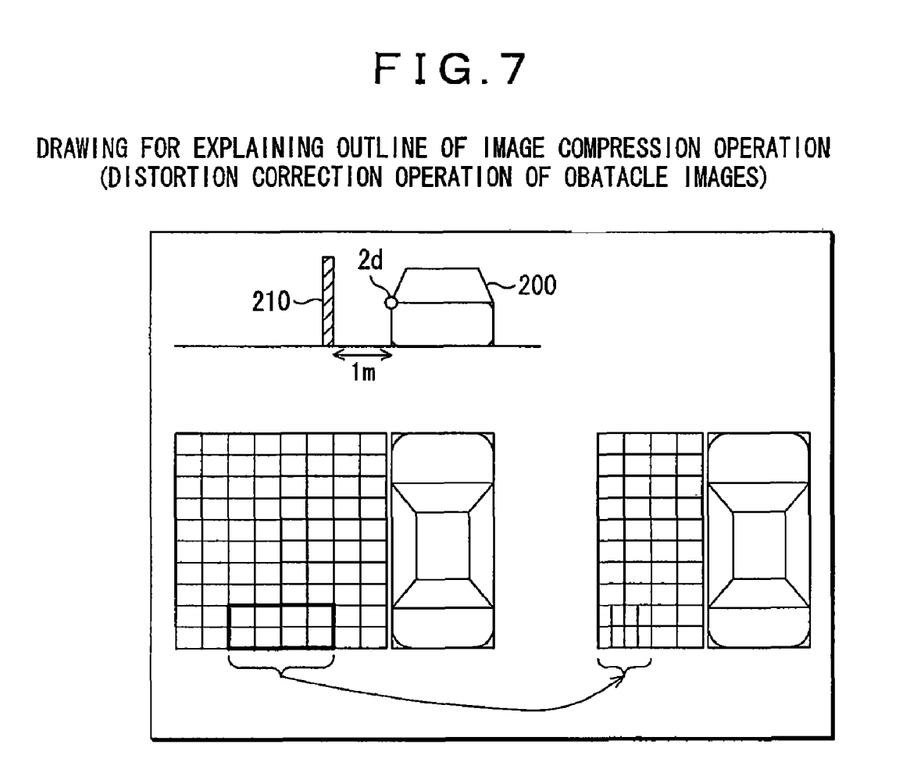
FIG. 7 is a drawing explaining an image compression operation (distortion correction operation for obstacle images) by an image compression controller according to the present embodiment.

That is, assume a case where when the vehicle 200 moves back from point A to point B, as shown in FIG. 3, the obstacle 210 is detected at a distance of 1 meter from the vehicle 200 as shown in FIG. 7. In this case, the image processor 5a viewpoint-converts the camera image in the range up to 1 meter from the vehicle 200, into the background image in the range up to 1 meter from the vehicle 200 using the normal mapping table information for the image in the internal region up to 1 meter from the vehicle 200, based on the left side camera images in which the obstacle 210 is detected.

Further, with respect to the external region exceeding 1 meter from the vehicle 200, the image processor 5a viewpoint-converts the camera image in the range of 1 to 3 meters from the vehicle 200, into the background image in the range of 1 to 2 meters from the vehicle 200 using the compression mapping table information for the image portion in the interval from point A to point A where the obstacle 210 is detected. On the other hand, the image processor 5a viewpoint-converts the camera image in the range of 1 to 2 meters from the vehicle 200, into the background image in the range of 1 to 2 meters from the vehicle 200 using the normal mapping table information for the image portion except the image in the interval from point A to point B.

Thereafter, when the vehicle 200 further moves back from point B, the interval gradually increases where the obstacle 210 is detected by the obstacle determination section 4. Thus, the image processor 5a sequentially compresses the images in the increasing intervals. Each time the interval where the obstacle 210 is detected increases by one line of the camera image, image compression of the additional line may be sequentially performed. Further, each time the interval where the obstacle 210 is detected increases by n lines (where "n" represents an integer equal to or more than 2), image compression of the increased "n" lines may be stepwise performed.

By doing so, among the camera images in the direction in which the obstacle is detected, only an image portion in which the obstacle 210 exists is compressed to correct the distortion of the obstacle 210, and at the same time, an image of the road surface in which the obstacle 210 does not exist, is not compressed. Therefore, a more realistic vehicle-periphery image is generated which minimizes driver discomfort.

In an alternate embodiment, when the vehicle 200 moves back to point B and the obstacle is detected by the obstacle determination section 4 as shown in FIG. 3, the entire image in the region positioned on the far side of the obstacle 210 and in a portion used as the display object range of the vehicle-periphery image, is compressed using the compression mapping table information. Then, the image portion, excluding the image in the interval where the obstacle 210 is detected, is reconverted into an uncompressed image using the normal mapping table information. Again, a more realistic vehicle-periphery image is generated, which minimized driver discomfort.

Further, in the present embodiment, an example of previously storing the normal mapping table information and the compression mapping table information in the mapping table information storage 5b is described. However, the present invention is not limited to this embodiment. For example, in another embodiment, only the normal mapping table information need be stored in the mapping table information storage 5b. When an obstacle is detected by the obstacle determination section 4, the image compression controller 6 generates the compression mapping table information from the normal mapping table information in real time.

The generation processing of the compression mapping table information can be performed, for example, by the following operation. That is, a predetermined matrix transform operation is performed on a parameter matrix used to generate the normal mapping table information. Then, using a new parameter matrix, the compression mapping table information is generated by the same operation as that in generating the normal mapping table information. By doing so, the amount of information stored in the mapping table information storage 5b can be reduced.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A vehicle-periphery image generating apparatus for viewpoint-converting each of a plurality of images captured by a plurality of cameras installed at different positions of a vehicle, and configured to combine the respective viewpoint-converted images to generate a vehicle-periphery image viewed from a virtual point of view above the vehicle, the apparatus comprising:
a viewpoint conversion processor configured to input a plurality of images captured by the plurality of cameras, and configured to viewpoint-convert the plurality of images using mapping table information, and combine the respective viewpoint-converted images to generate the vehicle-periphery image;
an obstacle detector configured to detect an obstacle around the vehicle and determine a distance from the vehicle to the obstacle; and
an image compression controller configured to control compression when the obstacle having a width greater than a predetermined amount is detected at a distance less than a predetermined distance from the vehicle, the compression based on:
a center direction of the images around the vehicle,
a width of an image in the direction in which the obstacle is detected, and
a region positioned on the far side of the obstacle as viewed from the vehicle among the images around the vehicle.

2. The vehicle-periphery image generating apparatus according to claim 1, wherein:
the obstacle detector includes a moving distance detector configured to detect a distance that the vehicle has moved, and including a sensor section configured to detect a presence or absence of the obstacle and the distance from the vehicle to the obstacle based on a reflected radio wave, and configured to detect the obstacle around the vehicle when the moving distance detector detects that the vehicle moves for a predetermined distance.

3. The vehicle-periphery image generating apparatus according to claim 1, wherein:
the viewpoint conversion processor utilizes normal mapping table information when the obstacle is not detected, and compression mapping table information when the obstacle is detected; and
the image compression controller controls the viewpoint conversion processor to perform viewpoint conversion processing using the normal mapping table information for an image in the region positioned on the near side of the obstacle, and using the compression mapping table information for an image in the region positioned on the far side of the obstacle, the viewpoint conversion processing being performed based on a distance from the vehicle to the obstacle detected.

4. The vehicle-periphery image generating apparatus according to claim 1, wherein:
the image compression controller controls compression of the entire image in the region positioned on the far side of the obstacle as viewed from the vehicle and in the portion used as a display object range of the vehicle-periphery image.

5. The vehicle-periphery image generating apparatus according to claim 1, wherein:
the obstacle detector includes a moving distance detector configured to detect a distance moved by the vehicle, and including a sensor section for detecting the presence or absence of the obstacle and the distance from the vehicle to the obstacle, based on a reflected wave radio wave, and configured to detect the obstacle in the interval where the vehicle moves; and
the image compression controller configured to control compression of an image in the region positioned on the far side of the obstacle as viewed from the vehicle and in the interval where the obstacle is detected.

6. The vehicle-periphery image generating apparatus according to claim 1, wherein:
the viewpoint conversion processor uses normal mapping table information when the obstacle is not detected; and
the image compression controller is configured to control the viewpoint conversion processor to perform viewpoint conversion processing by generating, from the normal mapping table information, compression mapping table information used when the obstacle is detected and by using the compression mapping table information for the images around the vehicle captured by a camera in the direction in which the obstacle is detected.

7. A method of correcting distortion of an obstacle image within a vehicle-periphery image and combining respective viewpoint-converted images, the vehicle-periphery image being viewed from a virtual point of view above the vehicle, the method comprising:
detecting an obstacle around the vehicle and determining a distance from the vehicle to the obstacle; and
performing viewpoint conversion using normal mapping table information for the images around the vehicle for which the obstacle is not detected in the detection step;
performing viewpoint conversion processing using compression mapping table information for the images around the vehicle for which the obstacle is detected at a distance greater than a predetermined distance from the vehicle in the detection step, the compression mapping table information corresponding to information for compressing a width of an image in the direction in which the obstacle having a width greater than a predetermined amount is detected, and in the region positioned on the far side of the obstacle, and combining the respective viewpoint-converted images to generate the vehicle-periphery image.

8. The method of correcting distortion of a vehicle-periphery image according to claim 7, wherein
when the obstacle is detected in the detecting step, viewpoint-conversion processing is performed using the normal mapping table information for an image in the region positioned on the near side of the obstacle, and is performed using the compression mapping table information for an image in the region positioned on the far side of the obstacle.

9. The method of correcting distortion of a vehicle-periphery image according to claim 7, wherein the detecting step further includes:
detecting the presence or absence of the obstacle by a sensor section based on a reflected radio wave;
detecting a distance moved by the vehicle; and
detecting the obstacle around the vehicle when it is determined that the vehicle moves for a predetermined distance if the sensor section indicates that the obstacle exists.

10. The method of correcting distortion of a vehicle-periphery image according to claim 7, wherein
in the viewpoint-converting, when the obstacle is detected in the detecting step, the compression is performed on the whole of an image in the region positioned on the far side of the obstacle and in the portion used as a display object region of the vehicle-periphery image.

11. The method of correcting distortion of a vehicle-periphery image according to claim 7, wherein the detecting step includes:
detecting the presence or absence of the obstacle by a sensor section based on a reflected radio wave;
detecting a distance traveled by the vehicle; and
detecting the obstacle in the interval where the vehicle moves while the sensor section indicates that the obstacle exists.

12. The method of correcting distortion of a vehicle-periphery image according to claim 11, wherein
in the viewpoint-conversion step, when the obstacle is detected in the detecting step, the compression is performed on an image in the region positioned on the far side of the obstacle and in the interval where the obstacle is detected in the detecting step.

* * * * *